United States Patent Office 3,265,768
Patented August 9, 1966

3,265,768
COPOLYMER MIXTURES OF TETRAHYDRO-
FURFURYL METHACRYLATE
Edward H. Mottus and Joseph E. Fields, Ballwin, Mo., assignors to Monsanto Company, a corporation of Delaware
No Drawing. Filed Nov. 19, 1962, Ser. No 238,706
27 Claims. (Cl. 260—885)

The invention relates to a new and improved process for providing oil-soluble tetrahydrofurfuryl methacrylate polymers useful as oil additives and which have improved viscosity-stability in the presence of heavy duty barium detergent additives.

This application is a continuation-in-part of copending application Serial No. 224,883, filed August 31, 1962. These additives are especially useful as low-temperature detergency additives in mineral oils.

It is an object of the invention to provide a new and improved method of making the new tetrahydrofurfuryl methacrylate polymers.

It is another object of this invention to provide new and useful low-temperature detergency additives for oils and to oil compositions thereof.

These and other objects of the invention will become apparent as the detailed description of the invention proceeds.

In the new process of the invention the alkyl methacrylate monomers are polymerized for a sufficient length of time prior to the addition of the tetrahydrofurfuryl methacrylate monomer that the final product is stable in the presence of heavy-duty detergents such as barium detergents. The time for polymerizing the alkyl methacrylate monomers before adding the tetrahydrofurfuryl methacrylate monomer will vary somewhat depending on the particular alkyl methacrylate monomers being used and the amount and method of addition of the tetrahydrofurfuryl methacrylate monomers; however, normally the alkyl methacrylate monomers are polymerized to incorporate not more than about 90 mole percent of the alkyl methacrylate monomers in the polymer before adding the tetrahydrofurfuryl methacrylate monomer, and usually from about 40 to about 75 mole percent of the alkyl methacrylates will be incorporated into the polymer before the addition of the tetrahydrofurfuryl methacrylate monomer; then, the polymerization is continued to completion causing substantially all of the monomers to be incorporated into the polymer. A free-radical type catalyst is used as is customarily used for alkyl methacrylate polymerizaiton, and reaction conditions of temperature and pressure are those customarily used. The monomer 5-methyl tetrahydrofurfuryl methacrylate can be used instead of tetrahydrofurfuryl methacrylate or mixtures thereof can be used.

The polymer additives made by the new process of the invention are the tetrahydrofurfuryl methacrylate and alkyl methacrylate polymers containing a minor amount of tetrahydrofurfuryl methacrylate and in major amount alkyl methacrylates. The major amount means in excess of 50 percent by weight and a minor amount means less than 50 percent by weight, and obviously when two minor amounts are specified along with the major amount the two minor amounts must add up to less than 50% by weight.

As dispersant additives these tetrahydrofurfuryl methacrylate/alkyl methacrylate polymers of the invention are useful as additives to oils, such as automatic transmission oils, lubricating oils, diesel oils, furnace oils, hydraulic oils and the like. The oils can either be mineral or synthetic oils. Normally these polymers as dispersant additives will be incorporated in oil in amounts of from about 0.5 to about 15% based on the oil and the polymer, preferably from about 1 to about 10%; except that if made up in concentrate form for blending back, they may be incorporated in amounts of about 15 to 60%, preferably to the extent of at least about 1% in oil. The solubility will, of course, vary depending on the particular oil used. Oil solubility can be regulated to a certain extent by limiting the molecular weight of the polymer, specific viscosity measurements being indicative of molecular weight. Specific viscosity, 1% in benzene at 25° C. should be between 0.4 and 7.0, preferably between 0.6 and 3.0. Solubility in oil can also be regulated by the number of carbon atoms in the alkyl groups of the methacrylates, which should be at least 6 carbon atoms, and preferably average at least 7.5 where the oil is a mineral lubricating oil. Single alkyl methacrylates can be used in making the polymers such as those having from about $C_6$ to about $C_{20}$ alkyl groups or mixtures of methacrylate monomers such as $C_8$–$C_{20}$ plus $C_1$–$C_4$ alkyl methacrylates. If a mixture of short and long-chain alkyl methacrylate monomers are used with the tetrahydrofurfuryl methacrylate to form polymers of the invention, the long-chain alkyl methacrylates are preferably present in weight percent excess over the short-chain alkyl methacrylates, but in any event the amount of short-chain alkyl methacrylate is restricted to insure oil solubility of the polymer. For the purposes of the invention, oil solubility is defined as the polymer being soluble at 25° C. to the extent of at least 1% in a petroleum base hydraulic fluid meeting government specifications MIL–O–5606.

The following is a non-limiting and illustrative list of alkyl methacrylate monomers from which can be chosen single monomers or combinations of monomers for use in making the polymers of the invention: methyl methacrylate, ethyl methacrylate, n-propyl methacrylate, isopropyl methacrylate, n-butyl methacrylate, isobutyl methacrylate, t-butyl methacrylate, n-amyl methacrylate, n-hexyl methacrylate, n-heptyl methacrylate, n-octyl methacrylate, isooctyl methacrylate, n-decyl methacrylate, n-dodecyl methacrylate, t-dodecyl methacrylate, Oxotridecyl methacrylate, "Lorol" methacrylate, tallow methacrylate, n-eicosyl methacrylate, etc. "Lorol" alcohols are mixtures of straight-chain $C_8$–$C_{18}$ alcohols being mostly $C_{12}$ alcohols. Tallow methacrylate is a mixture of about 33% by weight of $C_{16}$ and 67% weight of $C_{18}$ straight-chain alkyl methacrylates.

In the method of the invention tetrahydrofuryl methacrylate and alkyl methacrylates can be polymerized with minor amounts of other monomers such as N-vinyl-pyrrolidone, vinyl pyridine, vinyl acetate, vinyloxyethanol, methacrylamides, hydroxyalkyl methacrylates and acrylates, e.g. hydroxyethyl methacrylate, amonoalkyl methacrylates and acrylates, e.g. dimethylaminoethyl methacrylate, t-butylaminoethyl methacrylate, etc., polyalkyleneoxy methacrylates and acrylates, polyaminoalkylene acrylates and methacrylates, hydroxy- and aminoalkyl derivatives of fumaric and maleic acids, etc. These other monomers will be added with the alkyl methacrylates at the start of the polymerization, and the tetrahydrofurfuryl methacrylate will be added late in the usual fashion of the method of the invention.

Illustrative of other miscellaneous monomers which can be copolymerized with a tetrahydrofurfuryl ester are the following: methacrylic acid, acrylic acid, fumaric acid, maleic acid, maleic anhydride, etc. These monomers also will be added with the alkyl methacrylates at the start of the polymerization.

The process of the invention is carried out using free-radical generating catalysts such as peroxides, hydroperoxides, azo, boron and peroxygen compounds catalysts, etc., including irradiation with ultraviolet rays, X-rays, $\gamma$-rays, neutrons and the liks. Temperatures of reaction will be the same as those customarily used for polymerizing with the particular catalyst used and pressure or vacuum operation can be used as desirable, depending on the temperature of polymerization and solvent used in polymerization. It will be desirable in most cases to use a solvent during polymerization, such as benzene, toluene, xylenes and the like to maintain fluidity o fthe polymerizing mass and to facilitate completion of the polymerization. If the polymer is to be dissolved in oil, the oil can be added to the reaction mixture before the removal of the benzene. Rather than using benzene or similar volatile solvents, an oil such as a mineral oil can be used as the solvent during polymerization, the polymer product can easily be recovered and purified either by distillation under reduced pressure or by using a counter-solvent such as methanol to precipitate the polymer from the benzene. Reprecipitation from benzene using methanol can be used to further purify the polymer.

The invention will be more clearly understood from the following detailed description of specific examples thereof.

EXAMPLE 1

The apparatus used for making this run was a 4-necked glass flask fitted with a condenser, a stirrer, a thermometer and a Y-fitting to take two dropping funnels. In the stirrer motor circuit are ammeters to determine the power requirements. Ammeter readings are observed to follow the increase in viscosity in the polymerization mixture. The apparatus is flushed with nitrogen both before and during polymerization. To the flask was charged 64.6 g. of tridecyl metharcylate, 46.8 g. of tallow methacrylate, 8.5 g. of methyl methacrylate and 6.2 g. of tetrahydrofurfuryl methacrylate. A sample of 25 ml. of the monomer mixture was removed from the flask and to this was added 0.25 g. of benzoyl peroxide catalyst. The catalyst was dissolved in the monomers and added to a dropping funnel. The polymerization was carried out at about 95° C. At the beginning of the run 10 ml. of the monomer catalyst mixture was added to the flask. Periodically during the run 10 ml. amounts of base oil No. 1 was added to the reaction mixture to reduce the viscosity. At the end of one hour of polymerization 3 ml. of catalyst monomer mixture was added to the reaction flask, 3 ml. more at the end of one and three quarters hours, three ml. more at the end of 2½ hours, 3 ml. more at the end of three hours and a quarter and the balance of the catalyst monomer mixture was added to the reaction mixture at the end of four hours. During the pollymerization run a total of about 80 ml. of base oil No. 1 was added to the reaction mixture in 10 ml. amounts. At the end of the polymerization run an additional 120 ml. of base oil No. 1 was added to the reaction mixture. Additional base oil No. 1 was added to the reaction mixture to provide a 37% concentrate of polymer in oil. To the concentrate was added 1.25 g. of an antioxidant which was 4,4'-methylene-bis-[2,6-di-tert-butylphenol], and the antioxidant was incorporated into the concentrate by mixing and heating to 100–110° C./100 mm. A sample of the 37% concentrate was diluted with base oil No. 2 to 3% polymer concentration and viscosity determinations were made of the 3% polymer in oil. Specific viscosity at 100° F. was 0.858 and at 210° F. was 1.089. Efficiency was 1.269. Efficiency is a measure of the viscosity-temperature coefficient of a polymer in the solvent in which the measurements are made.

Efficiency=
 Specific viscosity at 210° F.
 Specific viscosity at 100° F.

In general the higher the efficiency the higher is the viscosity index.

Two different mineral base oils were used in making up and testing the additive compositions of Example 1, and these base oils were as follows:

Base oil No. 1

This oil is a highly parrafinic refined petroleum lubricating oil having the following properties:

| | |
|---|---|
| Viscosity at 100° F., SUS | 113 |
| Viscosity at 210° F., SUS | 40 |
| Flash point, ° F. | 380 |
| Specific gravity at 60° F. | 0.8639 |

Base oil No. 2

This oil is a solvent refined Mid-Continent petroleum lubricating oil, having the following properties:

| | |
|---|---|
| Viscosity at 210° F., centistokes | 10.39 |
| Viscosity at 100° F., centistokes | 91.73 |
| Viscosity index | 103.4 |
| Flash point, Cleveland open cup, ° F. | 450 |

EXAMPLE 2

This example was carried out in a similar manner to Example 1, except that the tetrahydrofurfuryl methacrylate monomer was not added to the flask as were the other monomers at the beginning of the polymerization run. After 1¾ hours of polymerization, one half of the tetrahydrofurfuryl methacrylate monomer was added in base oil No. 1 to the reaction mixture, and after two and one half hours of polymerization the balance of the tetrahydrofurfuryl methacrylate monomer was added in base oil No. 1 to the polymerization mixture. Viscosity and efficiency determinations were made on the product of Example 2 in a similar manner as described for the product of Example 1. In Table 1 which is inserted later, Examples 1 and 2 and the other experimental examples are summarized.

EXAMPLES 3 AND 4

Except for the tetrahydrofurfuryl methacrylate monomer all of the monomers were charged to the flask at the beginning of the polymerization. In addition to the other monomers of Example 1, a small amount of hydroxypropylmethacrylate was used. After one and three-quarters hours of polymerization, one half of the tetrahydrofurfuryl methacrylate monomer was added to the polymerization mixture in base oil No. 1, and after two and a half hours of polymerization the balance of the tetrahydrofurfuryl methacrylate monomer was added to the polymerization mixture in base oil No. 1. At the end of the polymerization run sufficient base oil No. 1 was added to make a 37% concentrate of the polymer. Other for the exceptions noted above, this run was carried out in a similar manner to Example 1. The final concentrate product was divided into two parts and to one part of the concentrate was added an ashless detergent in minor amount, and this sample with the ashless detergent in it was labeled Example No. 4.

EXAMPLES 5 AND 6

In this example the hydroxypropyl methacrylate rather than the tetrahydrofurfuryl methacrylate was added late in the polymerization reaction. All of the monomers except the hydroxypropyl methacrylate were charged to the polymerization vessel at the beginning of the polymerization period. After one and three-quarters hours of polymerization one half of the hydroxypropyl methacrylate dissolved in base oil No. 1 was added to the polymerization mixture, and after two and a half hours of polymerization, the balance of the hydropropyl methacrylate was added to the polymerization mixture. At the end of the polymerization a 37% concentrate was made by adding additional base oil No. 1. Other than the exceptions noted above, Example 5 was conducted in the usual fashion of Example 1. The concentrate was divided in two portions and to one portion was added a minor amount of the antioxidant 4,4'-methylene - bis - [2,6 - di - tert - butylphenol]. The antioxidant was incorporated into the concentrate in the usual fashion, and the sample with the antioxidant in it was labeled Example No. 6.

EXAMPLES 7 AND 8

This example was a run wherein all of the monomers except the tetrahydrofurfuryl methacrylate and methyl methacrylate were charged to the reaction flask at the beginning of the polymerization run. One-half of the tetrahydrofurfuryl methacrylate monomer and one-half of the methyl methacrylate monomer were added to the polymerization mixture in base oil No. 1 after one hour of polymerization time, and the other half of these two monomers was added to the polymerization mixture after one and three-quarters hours of polymerization time. Other than this Example 7 was carried out in the usual batch fashion. At the end of the polymerization run a 37% concentrate was made of the product by adding additional base oil No. 1. The concentrate product was divided into two parts and to one part was added a minor amount of ashless detergent, and the portion containing the ashless detergent was designated example No. 8.

EXAMPLES 9 AND 10

This example was a typical polymerization run wherein all of the monomers were charged to the reaction flask at the beginning of the polymerization run with the exception of methyl methacrylate and hydroxypropyl methacrylate. The methyl methacrylate and hydroxypropyl methacrylate monomers were dissolved in base oil No. 1 and one-half of each of these monomers was added to the polymerization reaction at the end of one hour of polymerization and the other half at the end of one and three-quarters hours of polymerization. At the end of the polymerization run the 37% concentrate of the additive was made by adding base oil No. 1. The concentrate was divided into two portions and to one portion was added a minor amount of ashless detergent, and this portion containing the ashless detergent was labeled Example No. 10.

EXAMPLES 11 AND 12

In this first example all of the monomers were added to the polymerization flask at the beginning of the polymerization run except the tetrahydrofurfuryl methacrylate monomer. At the end of one hour polymerization one-half of the tetrahydrofurfuryl methacrylate monomer was added to the polymerization reaction dissolved in base oil No. 1, and at the end of one and three-quarters hours the balance of the tetrahydrofurfuryl methacrylate monomer was added to the polymerization mixture. In the usual fashion a 37% concentrate of the polymer was made up. To one-half of this sample of concentrate was added a minor amount of ashless detergent, and this sample was labeled Example No. 12.

EXAMPLES 13 AND 14

In this example all of the monomers were added to the polymerization flask at the beginning of the polymerization reaction except the tetrahydrofurfuryl methacrylate monomer. At the end of one and one-half hours of polymerization, one-half of the tetrahydrofurfuryl methacrylate monomer dissolved in base oil No. 1 was added to the polymerization reaction, and at the end of two and one-quarter hours the balance of the tetrahydrofurfuryl methacrylate monomer was added. The usual 37% concentrate was made. To one-half of the concentrate was added a minor amount, 5.7 g. of ashless detergent and this was labeled Example No. 14.

EXAMPLES 15 AND 16

This example was a modified batch-type run in which one-half of all of the monomers plus all of the hydroxypropyl methacrylate monomer was added to the flask at the beginning of the polymerization run, and the other half of the monomers plus all of the tetrahydrofurfuryl methacrylate monomer was added to a dropping funnel. At the end of one and one-half hours of polymerization one-third of the mixture of monomers was added from the dropping funnel, at the end of two hours of polymerization one-third more of the monomers was added and at the end of two and one-half hours the balance of the monomers from the dropping funnel was added to the polymerization mixture. At the end of the polymerization run the 37% concentrate was made in the usual fashion, and to one-half of the 37% concentrate was added 5.3 g. of ashless detergent which was stirred in at 100° C. The sample containing the ashless detergent was labeled Example No. 16.

EXAMPLES 17 AND 18

In this example all of the monomers were charged to the reaction flask at the beginning of the polymerization run except the tetrahydrofurfuryl methacrylate monomer. At the end of one and three-quarters hours of polymerization one-half of the tetrahydrofurfuryl methacrylate monomer was added to the polymerization mixture dissolved in base oil No. 1, and at the end of two and one-half hours of polymerization the other half of the tetrahydrofurfuryl methacrylate monomer was added to the polymerization mixture. The usual 37% concentrate was made in base oil No. 1. To one-half of the concentrate was added 5.0 g. of ashless detergent which was stirred in at 100° C., and this was labeled Example No. 18.

EXAMPLES 19 AND 20

This example was run in a manner similar to Example 15 in that one-half of all monomers except the hydroxypropyl methacrylate monomer and all of the tetrahydrofurfuryl methacrylate monomer was added late in the polymerization run from a dropping funnel. The other half of the monomers, including all of the hydroxypropyl methacrylate monomer and none of the tetrahydrofurfuryl methacrylate monomer was added to the polymerization flask at the beginning of the run. At the end of one and one-half hours of polymerization one-third of the monomers were added to the reaction mixture from the dropping funnel, at the end of two hours of polymerization one-third more of the monomers were added to the polymerization reaction from the dropping funnel and at the end of two and one-half hours the balance of the monomers were added from the dropping funnel to the reaction flask. The usual 37% concentrate was made. To one-half of this concentrate was added 5.4 g. of ashless detergent, and this was labeled Example No. 20.

In Table 1, which follows, are summarized 20 experimental examples.

Table 1

| Ex. No. | Monomers | Monomers Mole Ratio | Specific Viscosity at 100° F. | Specific Viscosity at 210° F. | Efficiency | Time, Hrs. | Temp., °C. | Solvent | Catalyst |
|---|---|---|---|---|---|---|---|---|---|
| 1 | TrM/TaM/MM/THFM | 48.2/27.6/16.9/7.3 | 0.858 | 1.089 | 1.269 | 6 | 95 | Base Oil #1 | Bz²O². |
| 2 | TrM/TaM/MM/THFM | 48.2/27.6/16.9/7.3 | 0.968 | 1.119 | 1.156 | 6 | 95 | do | Bz²O². |
| 3 | TrM/TaM/MM/THFM/HPM | 46.4/26.5/16.3/6.9/3.9 | 0.814 | 1.053 | 1.294 | 6½ | 95 | do | Bz²O². |
| 4 | | | | | | | | | |
| 5 | TrM/TaM/MM/THFM/HPM | 46.4/26.5/16.3/6.9/3.9 | 1.038 | 1.347 | 1.298 | 6 | 95 | do | Bz²O². |
| 6 | | | | | | | | | |
| 7 | TrM/TaM/MM/THFM/HPM | 46.4/26.5/16.3/6.9/3.9 | 1.109 | 1.372 | 1.237 | 6¼ | 95 | do | Bz²O². |
| 8 | | | 1.123 | 1.345 | 1.198 | | | | |
| 9 | TrM/TaM/MM/THFM/HPM | 46.4/26.5/16.3/6.9/3.9 | 1.056 | 1.281 | 1.213 | 6¼ | 95 | do | Bz²O². |
| 10 | | | 1.081 | 1.260 | 1.166 | | | | |
| 11 | TrM/TaM/MM/THFM/HEM | 46.4/26.5/16.3/6.9/3.9 | 0.990 | 1.377 | 1.391 | 7 | 95 | do | Bz²O². |
| 12 | | | 1.011 | 1.370 | 1.355 | | | | |
| 13 | TrM/TaM/MM/THFM/HPM | 43.3/24.8/15.3/13.1/3.6 | 0.688 | 0.978 | 1.422 | 7 | 95 | do | Bz²O². |
| 14 | | | 0.721 | 0.988 | 1.370 | | | | |
| 15 | TrM/TaM/MM/THFM/HPM | 46.4/26.5/16.3/6.9/3.9 | 0.763 | 1.104 | 1.447 | 6 | 95 | do | Bz²O². |
| 16 | | | 0.795 | 1.094 | 1.376 | | | | |
| 17 | TrM/TaM/MM/THFM/HPM | 44.0/25.2/20.0/6.9/3.9 | 0.672 | 0.925 | 1.376 | 6 | 95 | do | Bz²O². |
| 18 | | | 0.683 | 0.916 | 1.341 | | | | |
| 19 | TrM/TaM/MM/THFM/HPM | 45.6/26.1/16.1/10.2/2.0 | 0.672 | 0.949 | 1.412 | 6¾ | 95 | do | Bz²O². |
| 20 | | | 0.708 | 0.959 | 1.353 | | | | |

KEY FOR TABLE 1
TrM—Tridecyl methacrylate.
TaM—Tallow methacrylate.
MM—Methyl methacrylate.
THFM—Tetrahydrofurfuryl methacrylate.
HEM—Hydroxyethyl methacrylate.
HPM—Hydroxypropyl methacrylate.
$Bz^2O^2$—Benzoyl peroxide.

To portions of a number of additive concentrates of the invention were added minor amounts of a heavy-duty barium detergent comprising sulfurized alkylated phenols reacted with barium and carbonated. Table 2 below summarizes the effect of varying the time of addition of certain monomers in producing polymer additives of the invention. Additives which are more viscosity stable in the presence of barium heavy duty detergents are produced in certain instances.

| Ex. No. | Results |
|---|---|
| 1 | Gel. |
| 2 | Clear compatible solution. |
| 3 | Do. |
| 4 | Superior to Ex. 3. |
| 5 | Gel in 20–25 sec. Stiff gel. at 1 min. |
| 6 | Same as Ex. 5. |
| 7 | More stringy than Ex. 3. Hazy in 20 min. |
| 8 | Similar to Ex. 3. |
| 9 | Not as bad as Ex. 5. No flow at 1 min. |
| 10 | Slow flow at 1 min. Starts to gel at 2 min. Gelled at 3 min. |

An examination of the data in Table 2 indicates that the tetrahydrofurfuryl methacrylate monomer should not be added with the other monomers at the beginning of the run, but rather this particular monomer should not be added until a substantial amount of polymerization of the other monomers has taken place in order to make a polymer having improved stability in the presence of a heavy duty barium detergent. Thus in runs 1, 5, 6, 9 and 10 where the tetrahydrofurfuryl methacrylate monomer was added with the other monomers at the start in the polymerization, gels were formed when heavy duty barium detergent was added to the concentrates containing the polymer, and of course this is very undesirable for lubricating oil additive use. In the other runs 2–4, 7 and 8 where the tetrahydrofurfuryl monomer was added late in the polymerization, gels were not formed. It seemed from the results of Table 2 that the procedure of Example 7 is not as desirable as that of Examples 2 and 3; however, the product of Example 7 was considerably more stable in the presence of the barium detergent than the examples where the tetrahydrofurfuryl methacrylate was added at the beginning of the polymerization run.

Although the invention has been described in terms of specified embodiments which are set forth in considerable detail, it should be understood that this is by way of illustration only and that the invention is not necessarily limited thereto since alternative embodiments and operating techniques will become apparent to those skilled in the art in view of the disclosure. Accordingly, modifications are contemplated which can be made without departing from the spirit of the described invention.

What is claimed is:

1. A process for making tetrahydrofurfuryl methacrylate and alkyl methacrylate copolymer mixture having improved viscosity-stability in the presence of a heavy duty barium detergent additive comprising heating at polymerizing temperatures in the presence of a free radical catalyst a major amount of an alkyl methacrylate monomer having not less than 6 and not more than 20 carbon atoms in the alkyl group for a time sufficient to polymerize at least a portion of said alkyl methacrylate to provide said stability, and then adding to the polymerizing alkyl methacrylate under polymerizing conditions a minor amount of tetrahydrofurfuryl methacrylate monomer based on said alkyl methacrylate in a manner to produce a mixture of copolymer species and continuing the polymerization until substantially all of the monomer content is incorporated in the polymer.

2. A process of claim 1 wherein not more than about 90 mole percent of said alkyl methacrylate is incorporated in said polymer prior to the addition of said tetrahydrofurfuryl methacrylate.

3. A process of claim 1 carried out in the presence of an inert solvent for the polymer.

4. A process of claim 3 wherein said alkyl methacrylate is a mixture of alkyl methacrylates having not less than 6 and not more than 20 carbon atoms in the alkyl groups, and mixed therewith is a minor amount of $C_1$–$C_4$ alkyl methacrylate.

5. A process of claim 3 wherein from 40 to 75% of said alkyl methacrylate monomer is incorporated into the polymer prior to the addition of the tetrahydrofurfuryl methacrylate monomer.

6. A process of claim 3 wherein said alkyl methacrylate has a minor amount of hydroxyethyl methacrylate added thereto.

7. A process of claim 3 wherein said alkyl methacrylate has a minor amount of hydroxypropyl methacrylate added thereto.

8. A process of claim 3 wherein said catalyst is a peroxide catalyst.

9. A process of claim 3 wherein said catalyst is benzoyl peroxide.

10. A process of claim 3 wherein said alkyl methacrylate has a minor amount of vinyloxyethanol added thereto.

11. A process of claim 3 wherein said alkyl methacrylate has a minor amount of N-vinyl-2-pyrrolidone added thereto.

12. A process of claim 3 wherein said alkyl methacrylate has a minor amount of t-butylaminoethyl methacrylate added thereto.

13. A process of claim 1 carried out in the presence of an inert solvent for the polymer, said alkyl methacrylate is a mixture of $C_6$–$C_{20}$ alkyl methacrylates, a minor amount of $C_1$–$C_4$ alkyl methacrylates is added to said alkyl methacrylate, and said catalyst is a peroxide catalyst.

14. A process of claim 13 wherein said catalyst is benzoyl peroxide.

15. A process of claim 14 wherein said alkyl methacrylate has a minor amount of hydroxyethyl methacrylate added thereto.

16. A process of claim 14 wherein said alkyl methacrylate has a minor amount of hydroxypropyl methacrylate added thereto.

17. A process of claim 14 wherein said alkyl methacrylate has a minor amount of vinyloxyethanol added thereto.

18. A process of claim 14 wherein said alkyl methacrylate has a minor amount of N-vinyl-2-pyrrolidone added thereto.

19. A process of claim 14 wherein said alkyl methacrylate has a minor amount of t-butylaminoethyl methacrylate added thereto.

20. A mixture of oil-soluble tetrahydrofurfuryl methacrylate copolymers having viscosity index improving properties, dispersant characteristics and stability in the presence of heavy-duty barium detergents, produced by the process of claim 1.

21. A copolymer mixture of claim 20 wherein from about 40 to about 90 mole percent of said alkyl methacrylate has been incorporated into said polymer before the incorporation of said tetrahydrofurfuryl methacrylate monomer.

22. A copolymer mixture of claim 21 wherein said oil-solubilizing monomer is a mixture of alkyl methacrylates having an average number of carbon atoms in the alkyl groups sufficient to give an oil-soluble polymer.

23. A copolymer mixture of claim 22 having a minor amount of vinyloxyethanol.

24. A copolymer mixture of claim 22 having a minor amount of N-vinyl-2-pyrrolidone.

25. A copolymer mixture of claim 22 having a minor amount of t-butylaminoethyl methacrylate.

26. A copolymer mixture of claim 22 having a minor amount of hydroxyethyl methacrylate.

27. A copolymer mixture of claim 22 having a minor amount of hydroxypropyl methacrylate.

References Cited by the Examiner

UNITED STATES PATENTS

| | | | |
|---|---|---|---|
| 2,129,665 | 9/1938 | Barrett et al. | 260—89.5 |
| 2,129,667 | 9/1938 | Barrett et al. | 260—89.5 |
| 2,330,773 | 9/1943 | Zimmer et al. | 252—56 |
| 2,380,304 | 7/1945 | Gleason | 252—56 |
| 2,580,053 | 12/1951 | Tutwiler et al. | 252—56 |
| 2,726,230 | 12/1955 | Carlson | 260—86.1 |
| 3,029,228 | 4/1962 | Glaris | 260—86.1 |
| 3,030,347 | 4/1962 | O'Brien et al. | 260—86.1 |
| 3,052,648 | 9/1962 | Bauer | 260—885 |
| 3,067,163 | 12/1962 | Bauer | 260—885 |

FOREIGN PATENTS 857,032  12/1960  Great Britain.

MURRAY TILLMAN, *Primary Examiner.*

PAUL M. COUGHLAN, Jr., *Examiner.*

T. D. TAYLOR, J. C. BLEUTGE, *Assistant Examiners.*

UNITED STATES PATENT OFFICE
CERTIFICATE OF CORRECTION

Patent No. 3,265,768            August 9, 1966

Edward H. Mottus et al.

It is hereby certified that error appears in the above numbered patent requiring correction and that the said Letters Patent should read as corrected below.

Column 2, line 56, for "N-vinyl" read -- N-vinyl-2- --; line 59, for "amonoalkyl" read -- aminoalkyl --; column 3, line 13, for "compounds" read -- compound --; column 4, lines 9 and 10, should appear as shown below instead of as in the patent:

$$\frac{\text{Specific viscosity at } 210° \text{ F}}{\text{Specific viscosity at } 100° \text{ F}}$$

Column 5, line 14, for "hydropropyl" read -- hydroxypropyl --; column 7, line 35, insert as a heading -- Table 2 --; columns 7 and 8, Table 1, fifth column, line 18 thereof, for "0.959" read -- 0.958 --; same Table 1, tenth column, lines 1 to 11, strike out "$B_z2O2$", each occurrence, and insert instead -- $B_{z2}O_2$ --; column 8, line 31, for "mixture" read -- mixtures --.

Signed and sealed this 1st day of July 1969.

(SEAL)
Attest:

EDWARD M. FLETCHER, JR.        WILLIAM E. SCHUYLER, JR.
Attesting Officer                 Commissioner of Patents